Oct. 7, 1958
J. W. WAUGH
2,855,470
CURRENT COLLECTOR
Filed June 22, 1954
2 Sheets-Sheet 1
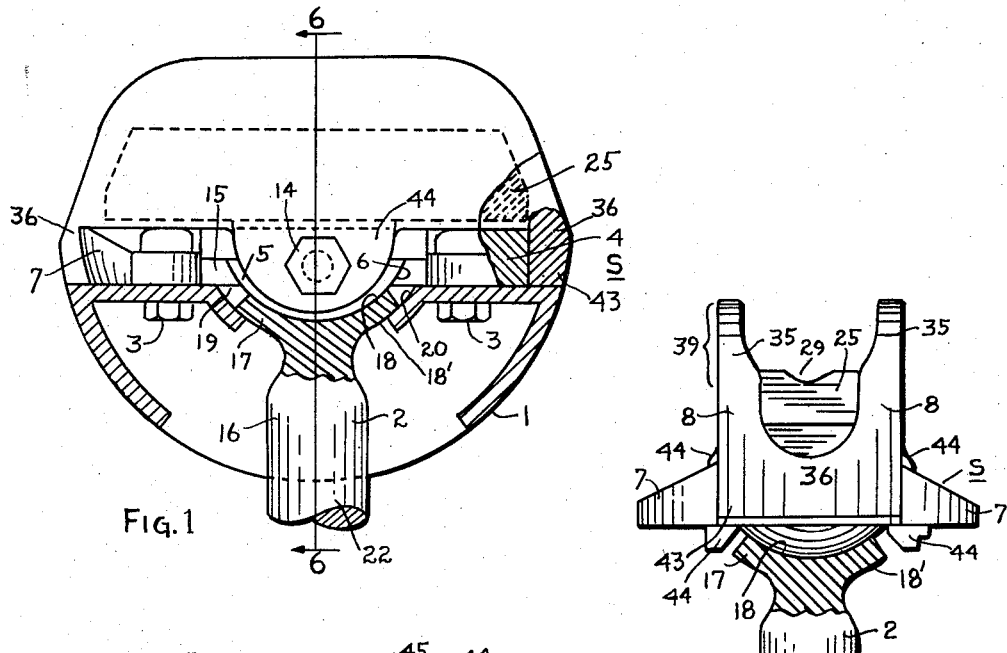
Fig. 1
Fig. 2
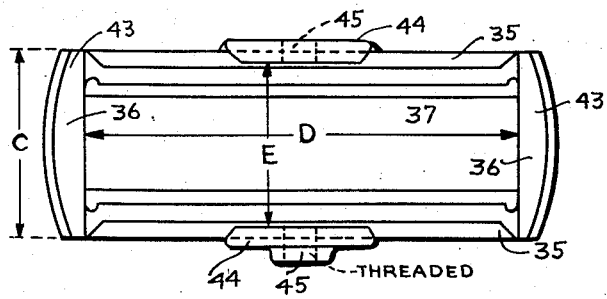
Fig. 3
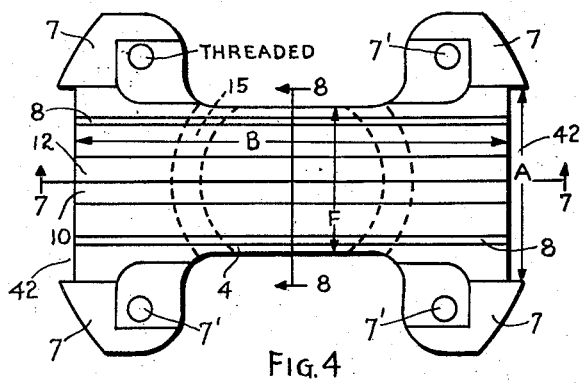
Fig. 4
INVENTOR.
JOHN W. WAUGH
BY
ATTORNEY.

Oct. 7, 1958  J. W. WAUGH  2,855,470
CURRENT COLLECTOR
Filed June 22, 1954  2 Sheets-Sheet 2
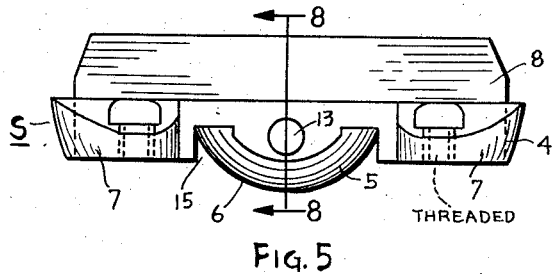
FIG. 5
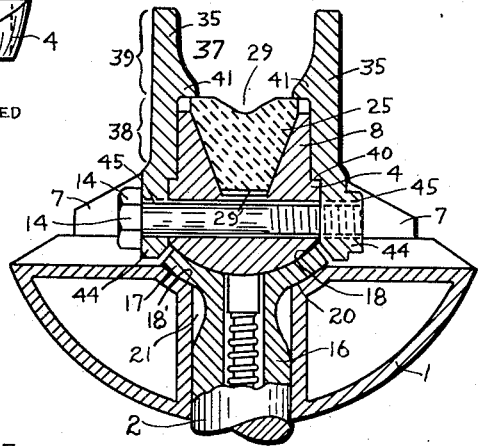
FIG. 6
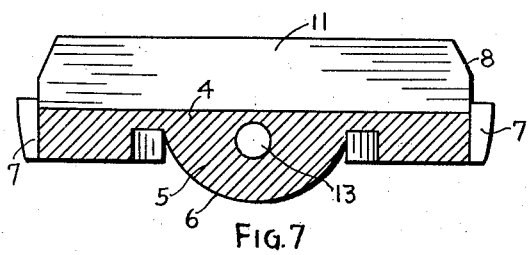
FIG. 7
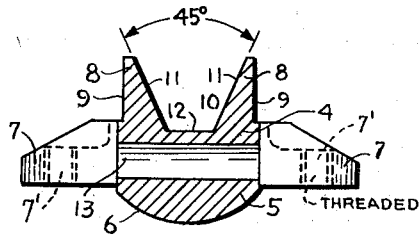
FIG. 8
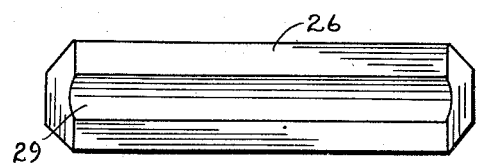
FIG. 9
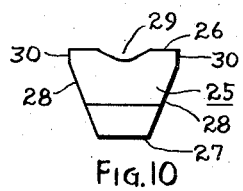
FIG. 10
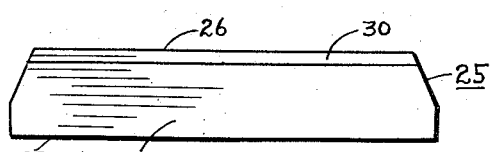
FIG. 11
FIG. 12
INVENTOR.
JOHN W. WAUGH.
BY
ATTORNEY.

United States Patent Office 2,855,470
Patented Oct. 7, 1958

2,855,470

CURRENT COLLECTOR

John W. Waugh, Bellville, Ohio, assignor to The Ohio Brass Company, Mansfield, Ohio, a corporation of New Jersey Application June 22, 1954, Serial No. 438,368

12 Claims. (Cl. 191—59.1)

This invention relates to current collector heads suitable for mounting on electrically operated vehicles for collecting current from a trolley wire as the vehicle moves along the right-of-way with the collector in contact with the trolley wire; the current is led by a suitable conductor to the vehicle where it is distributed to the various apparatus as required.

The collector is of the shoe or sliding contact type and is mounted on the upper end of the trolley pole with interposed insulation as disclosed in my copending application Serial No. 390,470, filed November 6, 1953, now U. S. Patent 2,834,841 granted May 13, 1958, a mounting which is quite universally used, especially in trolley coach operation.

A complete head comprises as a rule a saddle member and holder which cooperate to receive an insert which normally is a frangible current collecting member made of carbonaceous material but may be of suitable metal such as copper or copper alloy or some of the so-called white metals. The above parts are assembled with a bowl-shaped member and then mounted on support elements as disclosed in the above application and later described and by means of which the movement of the holder, saddle, bowl and insert relative to the vehicle is controlled.

In trolley coach operation it is essential that the collector shoe (holder and insert) moves freely with respect to the lateral movements of the coach as it moves along the right-of-way and such movements comprise a rotation in a horizontal plane and a pivotal movement in a single vertical plane.

One object of this invention is to provide a construction in which the holder and insert (called the shoe) are secured to the saddle member by a single means whereby a worn insert may be replaced in the shortest time and simplest manner.

Another object is to provide a collector in which a single means secures the holder to the saddle member and at the same time secures the insert in position in the saddle member.

It is another object of this invention to provide the holder and saddle with cooperating means whereby all impact upon the collector as it contacts with the overhead fittings in the path of the moving collector, will be absorbed by the parts other than the single means securing the parts together.

Another object is to provide a construction in which the insert is so held in place that it makes efficient contact with the saddle member and provides automatic clamping effect between the side faces of the insert and the cooperating side faces of the saddle thereby tending to prevent longitudinal cracks forming in the insert if of frangible material.

Another object is to provide an elongated insert having its longitudinal faces obliquely disposed to each other and the cooperating faces on the saddle being correspondingly sloped, whereby any wear on part of the insert side faces will permit the insert to slide relative to the saddle under pressure of the trolley wire and automatically maintain normal contact with the saddle.

Another object is to provide a construction in which the relation between the side faces of the insert and the cooperating side faces on the saddle are such that there is a clamping effect upon the insert to hold any broken parts in place until the insert has served out its intended life.

Another object is to provide a current collector in which the insert is provided with resilient means whereby close manufacturing tolerances are not required and will provide a cushioning effect between the insert and its support or saddle permitting downward movement of the insert relative to its support and the absorption of impact upon the insert resulting in the reduction of breakage of the insert when made of a frangible conducting material.

Other objects will be apparent as the construction and operation of the invention is further disclosed.

In the drawing:

Fig. 1 is a side view of the holder, saddle member, insert shown mounted on a bowl-shaped member and support stud (both in section) on which the said parts are mounted for movement.

Fig. 2 is an end view of the holder, saddle and insert of Fig. 1 shown mounted on a support stud (in section) permitting movement relative thereto.

Fig. 3 is a substantially full size bottom view of the holder of Fig. 1.

Fig. 4 is a substantially full size top plan view of the saddle.

Fig. 5 is a side view of Fig. 4.

Fig. 6 is a transverse section of Fig. 1 on the line 6—6.

Fig. 7 is a longitudinal section on the line 7—7 of Fig. 4.

Fig. 8 is a transverse section on the line 8—8 of Fig. 4.

Fig. 9 is a top view of an insert.

Fig. 10 is an end view of Fig. 9.

Fig. 11 is a side view of Fig. 9.

Fig. 12 is a transverse section of another insert similar to that shown in Figs. 9–11 and seated in a longitudinal groove in the saddle member.

The invention described herein is an improvement over that disclosed in U. S. Patent 2,044,886 of June 23, 1936 and in particular with reference to the holder, the saddle and the insert.

In the disclosure herein, the parts which constitute the improvement are mounted on a bowl-shaped member 1 also shown in the above patent and together with the stud 2 control the movements of the super members so that they rotate in a substantially horizontal plane, or a plane normal to the axis of the stem and also pivot in a single vertical plane or a plane corresponding to the axis of the stem.

Mounted on the bowl-shaped member 1 which is of metal such as cast iron or bronze, or may be formed from sheet metal or other suitable material is the saddle S secured thereto by the bolts 3.

The saddle is provided with a central or body portion 4 from which a support 5 projects from the lower side and having a spherical bearing surface 6. The body portion 4 is provided with the four corner lugs 7 which may have threaded orifices to receive the bolts 3.

Projecting from the upper side of the body portion 4 are a pair of upstanding spaced longitudinally extending side flanges 8. The outer surfaces 9 (Fig. 8) of the flanges are parallel and in planes normal to the horizontal plane of the central portion 4. The flanges 8 form therebetween a longitudinal trough or groove 10 (Fig. 8) open at the ends and the surfaces 11 of the trough are obliquely disposed to each other thereby forming the groove 10 having a closed bottom 12 and an open top which is wider than the width of the closed bottom 12, depending upon the angles made by the upwardly and outwardly extending planes or surfaces 12. In Fig. 8 the included angle is shown as substantially 45 degrees but this may be changed to meet requirements.

The saddle is provided with a transverse through opening 13 intermediate the ends to receive a fastening means 14 (Fig. 6) such as a bolt or round head screw. The saddle is also provided with a groove 15 surrounding the spherical support 5 as later explained.

The bowl-shaped member 1 (hereinafter referred to as the bowl) and the saddle are secured together by fastening means 3 as before stated and act as a unit mounted on the support stud 2; the upper portion 16 of the stud 2 is an enlarged supporting cup-shaped flange 17, the upper or bearing surface 18 being concaved and the lower bearing surface 18' being convexed and parallel to the surface 18. The curvature of the surface 18 conforms to that of the surface 6.

The bowl 1 has a central opening surrounded by a cup-shaped recess 19 which has a bearing surface 20 conforming to the curvature of the cooperating surface 18'. The surfaces 6 and 18 coact together and the surfaces 18' and 20 coact together and being spherical, the bowl 1 and super structure thereon are free to rotate in a plane normal to the longitudinal axis of the stud 2.

The bowl is provided with a slot 21 through which extends the stud 2, the lower portion 22 being arranged so as to be fixed in a sub-support against rotation as disclosed in applicant's copending application Serial No. 390,470 filed November 6, 1953.

The width of the slot 21 is substantially that of the diameter of the stud 2 and the length of the slot (Fig. 1) is such as to allow the bowl to pivot in a plane coinciding with the longitudinal axis of the stud 2. The groove 15 in the saddle provides clearance so that the bowl and the super members may pivot in said vertical plane an amount sufficient to meet requirements.

An insert preferably of a carbonaceous material is mounted in the groove 10 (Figs. 9–11) and comprises an elongated body 25 of uniform trapezoidal cross-section throughout its length, the planes of the upper and lower surfaces of the body being parallel and forming the bases of the trapezoidal shaped body. The upper base 26 being wider than the lower base 27 and the side faces 28 being obliquely disposed to the bases and to a vertical central plane; the upper base 26 is provided with a longitudinal groove 29 to initially receive the trolley wire.

The angle formed by the side faces 28 of the insert (Fig. 10) is substantially 45 degrees, at least it is the same as the angle between the faces 11 of the groove 10 such that the faces 11 will form supporting bearing surfaces for the cooperating faces 28 of the insert, thereby not only giving the maximum conducting contact surface between the insert and saddle but exerting an inward force upon the insert tending to prevent longitudinal cracks forming in the insert; the insert forms a wedge member in the groove 10.

The width formed by the side faces 28 of the insert are such that when a new insert is placed in the groove 10, the lower base 27 of the insert will be slightly spaced (possibly 1/16") from the face 12 of the saddle thereby forming an initial space 29' and the upper portion of the insert will project above the upper edge of the flanges 8 (Fig. 6); the initial projection of the upper portion of the insert may have straight parallel sides 30 forming a rectangular section of the insert or the upwardly outwardly sloping faces 28 of the insert and the face of the base 26 may be extended and intersect thereby forming an isosceles trapezoid in cross-section with acute angles along the upper longitudinal edges of the insert.

The trolley wire presses downwardly upon the wedge shaped insert thereby tending to maintain it in its lowest position and in constant contact with the side faces of the groove 10.

The holder shown in Figs. 1 to 3 inclusive and Fig. 6 is provided with a pair of spaced upright longitudinal flanges 35 held in spaced relation by end or bridging member 36 integrally secured to the flanges and of much lower height than the flanges 35. The members 35 and 36 form an elongated receptacle 37 having a lower portion 38 and an upper portion 39 (Fig. 6), the latter forming an open top and end groove which acts as a guide to maintain the collector in place upon the trolley wire unless inadvertently dislodged.

The lower portion 38 of the receptacle 37 is of such width and length as to receive the flanges 8 of the saddle and the height of the portion 38 is such that the holder will preferably rest upon the narrow longitudinal ledges 40 of the center portion 4 of the saddle while the longitudinal ridges 41 will retain the insert along its upper longitudinal edges (Fig. 6) when the insert is new and the holder assembled in place. The ends of the flanges 35 of the lower portion 38 of the receptacle 37 are formed inwardly sufficient to cover the ends of the flanges 8 thus preventing the endwise escape of the insert from the groove 10.

The holder and saddle members are so constructed that there is no lateral or longitudinal relative shifting. This is accomplished by forming a recess 42 at each end of central portion 4 of the saddle and providing a projecting portion 43 from each bridging member 36 of the holder. The width A of the recess 42 and the length B of the saddle are substantially the same as the width C and length D respectively of the holder such that the two members interengage with a sliding fit.

Depending from each flange 35 forming the side walls of the lower portion 38 of the receptacle 37 and midway the ends of the holder, are two lugs 44 which are normally spaced from the side surfaces of the central portion 4 of the saddle such that dimension E is greater than dimension F and each lug has a through opening 45 which registers with the opening 13 through the saddle when the holder and saddle are assembled. One opening 45 is threaded to receive the threaded end of the single fastening means 14. The diameter of the fastening means 14 is slightly less than the diameter of the openings 13 and 45 therefore does not contact the side wall of the opening 13 and since there is practically no relative movement between the holder and saddle, any impact blows upon the holder or saddle in passing through special overhead fittings such as trolley frogs and crossovers is absorbed by the holder and saddle and the fastening means therefore is not subject to bending which would prevent it being easily removed in replacing a worn-out insert.

When the fastening means is drawn up sufficiently, the lugs 44 will bend inward and grip the side faces of the saddle, thus securing the holder, the saddle and the insert in fixed relation. The holder being made preferably of a bronze, the lugs are not moved beyond their elastic limit and will spring away from the saddle when the tension of the bolt 14 is removed.

The supporting action of the saddle flanges 8 upon the insert is automatically maintained through the downwardly and inwardly slope of the surfaces of the flanges and the slope of the cooperating surfaces of the insert conforming thereto and the downward presure of the trolley wire upon the insert while the collector is in use, thus the wedging action between the saddle and insert and the conforming surfaces assume constant support for the insert and maximum contact efficiency, two essential features, especially when the insert is of a frangible conducting material.

The insert and saddle shown in the fragmentary transverse section in Fig. 12 are in all respects the same as the insert and saddle shown in Fig. 6 except in Fig. 12 a layer of resilient or yielding material 50 is interposed between one face of the insert and the adjacent face of the flange 8.

This yielding material may be a layer of rubber cement, which will lose its tackiness, an elastic plastic cement, or a strip of previously prepared resilient or yielding material secured as by cement to a side face of the insert, or the member 50 may be of yieldable fabric such as felt or any other suitable material. While the yielding material may be secured to a side face of the insert or of the groove, it is preferred to make the layer of yieldable material a component part of the insert.

The main purpose of the resilient member 50 whether secured to the insert or to the saddle flange is to permit the insert to yield relative to the saddle especially when installing a new insert thereby requiring less closeness to dimensions in manufacturing than in the case of the insert shown in Figs. 9, 10 and 11. The faces 11 and 28 (Fig. 12) will be in contact, but the opposite faces will be insulated from each other, however it has been found that the contact area of the faces 11 and 28 will afford ample conductivity except possibly under extremely high current consumption in which case the insert layer 50 may be formed of thin corrugated Phosphor bronze sheet secured in place by plastic cement.

The resilient or yielding member 50 which may cover all or a portion of one side face of the insert or the adjacent face of the saddle will also cushion the insert under impact conditions thus tending to reduce breakage.

The resilient member 50 also provides for initial contact pressure between faces 11 and 28 when the holder, insert, and saddle are assembled due to its compression resulting from contact between longitudinal ridges 41 of the holder and the top faces 26 of the insert. This feature prevents the insert from becoming loose in the saddle groove as a portion of face 26 will remain intact for the useful life of the insert.

Modifications will suggest themselves to those skilled in the art without departing from the spirit of the above described construction. It is my wish that all the matter described above or shown in the drawings, shall be taken as illustrative and not as a limitation.

I claim:

1. A current collector device comprising, a substantially vertical support stem having an upper surface upon which the current collecting portion of the device is pivotally mounted, a bowl shaped member surrounding and associated with the support stem, a saddle member secured to the upper surface of the bowl shaped member, the saddle member having a portion of its lower surface mounted upon the upper surface of the support stem whereby the saddle and bowl members are universally movable as a unit relative to the support stem, the saddle having a body portion and a longitudinal open top groove formed by longitudinally extending spaced upstanding flanges integrally united with the upper surface of the saddle body, the inner side faces of the flanges being obliquely disposed thereby forming a wedge shaped groove in cross-section with a bottom surface of less width than the width of the top opening, an elongated insert of current conducting material positioned in the said groove with side faces conforming to those of the flanges, an open top and bottom recessed holder mounted on the saddle and the walls of the lower portion of the recess surrounding the said flanges and the insert, the walls of the upper portion of the holder forming an open top groove whereby the upper surface of the insert is exposed for contact with a trolley wire, a transverse opening through the saddle body positioned below the upper surface of the saddle body, downward projecting lugs from the side walls of the holder, openings through the said lugs registering with the opening through the saddle body, and transverse securing means extending through the said openings to secure the holder to the saddle member and maintain the insert in position in its groove.

2. A current collecting device according to claim 1 characterized by the lower portion of the insert being truncated thereby providing the insert with a flat surface which is spaced from and held out of contact with the bottom surface of the groove.

3. A current collecting device according to claim 1 in which the upper portion of the insert projects above the upper edges of the flanges.

4. A current collector device comprising, a saddle member provided with an open top longitudinal groove, a pair of spaced longitudinal upstanding flanges forming the groove, the inner surface of the flanges being tapered with a bottom surface of less width than the width of the opening between the upper edges of the groove, an insert of frangible current conducting material positioned in the groove and conforming in cross-section to that of the groove, a holder having upstanding elongated side walls and lower end walls enclosing the sides and ends of the said flanges, the side walls of the holder having ridges projecting above the top portions of the said flanges and engaging the insert to hold the insert in the groove, the side walls of the holder projecting downwardly along the sides of the saddle, and a single transverse securing means associated with the said downwardly projecting portions of the side walls of the holder and with the saddle member to maintain the holder in fixed relation with the saddle and insert, and the saddle having a bearing surface on the underside thereof adapted to engage a support in movable relation thereto.

5. A current collector device comprising, a saddle member provided with a longitudinal groove formed by a pair of spaced longitudinal upstanding walls forming in cross-section an open top isosceles trapezoid, the bottom surface of the groove being of less width than the width of the top opening of the groove, a renewable insert of frangible material positioned in the groove and insertable through the top opening, the insert having side faces conforming to those of the groove whereby a positive and secure engagement is maintained between the insert and the saddle member, a removable holder mounted on the saddle member provided with upstanding spaced longitudinal flanges paralleling and surrounding the said side walls and ridges along the inside of the flanges projecting above the said side walls and engaging the top of the insert to hold the insert in the groove and being spaced transversely to expose the upper surface of the insert, and a transversely disposed single through fastening means operable to secure the holder to the saddle member.

6. A current collector device comprising, a saddle member having a body portion with an open top groove on one side of the member, the groove formed by spaced and upstanding walls, the inner surfaces of the walls being inwardly and downwardly tapered forming a groove with an open top, a renewable insert of frangible current conducting material positioned in the groove through the top opening having side faces conforming to those of the walls forming the groove, a holder mounted on the saddle to maintain the insert in position, the holder having spaced inwardly extending ridges engaged with the top of the insert and the holder having downwardly extending walls engaged with the walls of the saddle, and transversely disposed means associated with the holder and the saddle member to secure the holder to the saddle member.

7. A current collector device according to claim 6 in which resilient means is interposed between a portion of the adjacent contacting faces of the insert and saddle.

8. The invention in accordance with claim 6, the said inwardly extending ridges being also engaged with the ends of the insert to hold the insert against longitudinal movement in the saddle.

9. A current collector device comprising, a longitudinal body member of metal having a groove along one face with an open top through which a current conducting insert may be positioned in the groove in contact with the side faces of the walls forming the groove, an insert of current conducting material seated in the groove, the said side faces of the insert and of the walls forming the groove tapering downwardly and inwardly, the upper surface of the insert being exposed to engage a trolley wire, the side faces of the walls of the groove engaging with and conforming to the adjacent side face of the insert and supporting the insert, a holder comprising two side flanges engaged with the side walls of the body member an inwardly projecting means on the inside of the flanges engaged with the insert to maintain the insert in position within the groove, a single securing means for maintaining the body member and the holder in assembled relation, and means on the underside of the body member for mounting upon support means whereby the device may rotate and swivel in different planes.

10. A current collector device according to claim 9 having a yieldable means secured to one of the contacting surfaces of the insert or the groove for maintaining the engagement between the insert and the body member and the insert and the ridges of the holder.

11. A current collector comprising a holder in the form of an elongated metallic member having two spaced side walls rigidly held at the ends thereof by two end walls, a ridge along the inside of the upper part of each of the side walls extending along the length of the side walls and uniting with the end walls, a saddle comprising an elongated member received between the side walls and between the end walls of the holder, the saddle member having a groove extending longitudinally along the upper part thereof, the said groove having flat side walls tapered inwardly toward the bottom thereof for receiving a frangible insert, the side walls of the holder extending along the outside of the elongated member and engaging therewith, means for drawing the walls of the holder against the sides of the elongated member whereby the insert is held between the sides of the groove and the ridges on the walls of the holder, and support lugs projecting outwardly from the saddle member below the holder for securing the saddle and holder to a support member.

12. An insert for use in a current collector having a saddle with a top groove having inwardly tapered walls and a flat bottom and an insert holder over the saddle, comprising a straight elongated body of frangible current conducting material having a plurality of flat faces with plane longitudinal side faces inclined toward each other in the downward direction to form a narrow plane bottom face and a relatively wider plane top face for engagement by the holder to hold the insert in the saddle, a longitudinal groove in the top face for receiving a trolley wire, two plane end faces inclined toward each other in an upward direction for engagement by the holder to position the insert longitudinally in the saddle, and yieldable material secured to at least one of the side faces whereby variations in the spacing between the insert and the saddle groove are accommodated without adversely affecting the electrical and mechanical contact between the insert and the collector.

References Cited in the file of this patent

UNITED STATES PATENTS

| | | |
|---|---|---|
| 1,402,076 | Lamb | Jan. 3, 1922 |
| 2,221,611 | Schaake | Nov. 12, 1940 |
| 2,262,374 | Schaake | Nov. 11, 1941 |
| 2,691,701 | Larrson | Oct. 12, 1954 |
| 2,712,041 | Livingstone | June 28, 1955 |

FOREIGN PATENTS

| | | |
|---|---|---|
| 559,129 | Great Britain | Feb. 4, 1944 |
| 567,060 | Great Britain | Sept. 7, 1944 |
| 228,578 | Switzerland | Nov. 16, 1943 |
| 233,718 | Switzerland | Nov. 16, 1944 |